3,708,520
VINYL ESTERS OF DIALKYLHYDROXYPHENYL
ALKANOATES
Martin Dexter, Briarcliff Manor, John D. Spivack, Spring
Valley, and David H. Steinberg, Bronx, N.Y., assignors
to Ciba-Geigy Corporation, Greenburgh, N.Y.
No Drawing. Filed June 1, 1971, Ser. No. 149,049
Int. Cl. C07c 69/76
U.S. Cl. 260—473 S     7 Claims

ABSTRACT OF THE DISCLOSURE

Vinyl esters of dialkylhydroxyphenyl alkanoate monomers are prepared by a direct reaction of acetylene with an appropriate acid or the acidolysis of vinyl acetate or isopropenyl acetate. These monomers can be polymerized with a free radical initiator yielding polymeric materials which will protect organic materials in general and particularly, synthetic polymers such as polyolefins against oxidative and thermal degradation.

---

The monomeric compounds of this invention which are vinyl esters of dialkylhydroxyphenyl alkanoates or oxyalkanoates can be represented by the following formula:

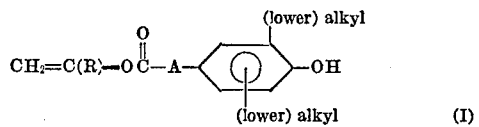

wherein
R is hydrogen or methyl group,
A is —$C_nH_{2n}$—, or —$C_mH_{2m}O$—,
n is 0 to 6, straight or branched, preferably 0 or 2; and
m is 1 to 6, preferably 1 or 2.

Lower alkyl groups containing up to and including 6 carbon atoms illustratively include methyl, ethyl, n-propyl, isopropyl, n-butyl, t-butyl, hexyl, and the like. These groups are substituents on the phenolic group. One alkyl substituent is in a position ortho to the hydroxy group and a second alkyl group is either (a) in the other position ortho to the hydroxy group or (b) in the position meta to the hydroxy group and para to the first alkyl group. Preferred are the dialkyl-4-hydroxyphenyl groups wherein the alkyl groups are branched groups such as isopropyl, t-butyl or t-amyl. However, other arrangements are also contemplated, such as 3-t-butyl-6-methyl-4-hydroxyphenyl group, 3,5-di-isopropyl - 4 - hydroxyphenyl group, 3,5-di-t-hexyl - 4 - hydroxyphenyl group, 3,5-dimethyl - 4 - hydroxyphenyl group or 3,5-di-n-hexyl-4-hydroxyphenyl group.

General procedures for preparing said monomers include the general methods used in preparing alkyl and aryl vinyl esters such as
(a) the direct reaction of acetylene with an acid

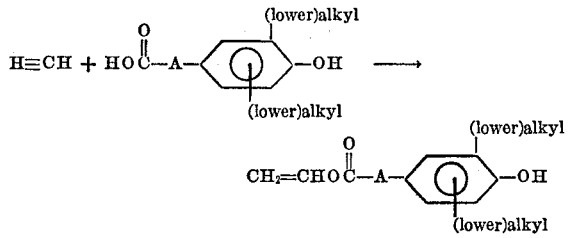

(b) the acidolysis of vinyl acetate or isopropenyl acetate

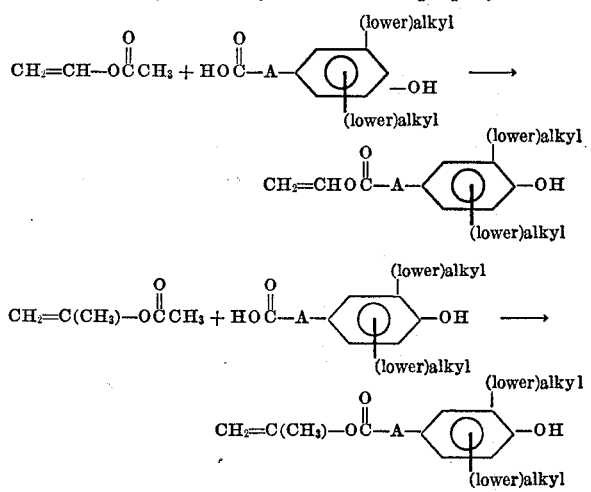

as described in C. E. Schildknecht, "Vinyl and Related Polymers," pages 323–385 (J. Wiley & Sons, Inc., New York 1952).

The preferred method, if the synthesis is carried out on a laboratory scale, in method (b), described in detail in Example 1 in the preparation of vinyl 3-(3,5-di-t-butyl-4-hydroxyphenyl)-propionate.

The procedures used in preparing the hindered phenolic acids employed in the preparation of the monomers of this invention and listed in Table I below have been disclosed in the prior art. The syntheses of these acids include the reaction of alkali metal salts of an alkylated phenol with methyl acrylate; the reaction of alkali metal salts of alkylated phenols with esters of α-haloalkanoic acids; the reaction of alkylhydroxybenzyl chlorides with alkali metal cyanides to obtain alkylhydroxyphenylacetonitriles followed by hydrolysis to the acids.

Where esters are prepared by the above mentioned methods, the free acids can be obtained by hydrolysis of the ester with sodium hydroxide. The preparation of some of the acids employed herein is also described in U.S. Pat. No. 3,249,632.

The monomeric compounds of this invention can be homopolymerized or copolymerized with other ethylenically unsaturated monomers employing free radical initiators. The initiators useful in the polymerization of these monomers are azoalkyl nitriles or azoarylnitriles which dissociate into alkyl or aryl radicals at temperatures convenient for copolymerization reactions. The best known example of an azo nitrile is 2,2'-azo-bis-isobutyronitrile and the dissociation providing the required alkyl radicals. Also useful in said polymerizations are alkyl peroxides or aryl peroxides which decompose into alkyl or aryl radicals. The polymers formed from the polymerization of the monomers of this invention contain hindered phenolic groups and therefore are useful as antioxidants for organic materials subject to oxidative and/or thermal degradation. These polymers are particularly useful as antioxidants for polyolefins such as polypropylene or polyethylene. However, other synthetic polymers can also be stabilized by the polymeric antioxidants prepared from the monomers of this invention. The preparation of the polymers from said monomers and their use as antioxidants for organic materials are described in greater detail in the copending application Ser. No. 68,563, filed Aug. 31, 1970.

The following are presented to further illustrate the present invention without introducing any limitation thereto.

EXAMPLE 1

Vinyl 3-(3,5-di-t-butyl-4-hydroxyphenyl)propionate

A solution consisting of 13.9 g. (0.05 mole) of 3-(3,5-di-t-butyl-4-hydroxyphenyl) propionic acid and 43.0 g. (0.50 mole) of redistilled vinyl acetate was treated with 0.2 g. of mercuric acetate while stirring at 50° C. After 15 minutes, 0.02 ml. of 100% sulfuric acid was added and the reaction mixture refluxed in nitrogen atmosphere for 3 hours. The reaction was cooled and neutralized with 0.5 g. of sodium acetate ($Na_2C_2H_3O_2 \cdot 3H_2O$). The solution was decanted from the insoluble solids and stripped of volatiles, leaving 16.5 g. of residue. This was dissolved in 50 ml. of benzene and passed through a bed of 144 g. of alumina (Woelm, neutral, activity II). The alumina was washed with an additional 200 ml. of benzene. Removal of the solvent afforded 12.7 g. (83.5% yield) of product which spontaneously crystallized to a white solid having melting point 70–74° C. The product was crystallized from 50 ml. of hexane with ice bath cooling to give 9.2 g., M.P. 71–4° C. An analytical sample was obtained by treating 1.05 g. in a sublimation apparatus at 100° C./0.05 mm. There was obtained 1.00 g. (95% recovery) of sublimate having melting point 72–5° C. and whose NMR spectrum conformed to the expect structure.

*Analysis.*—Calc'd for $C_{19}H_{28}O_3$ (percent): C, 74.96; H, 9.27. Found (percent): C, 75.12; H, 9.17.

Employing the method described in Example 1, the following vinyl esters are prepared from vinyl acetate or isopropenyl acetate and the listed acids containing hindered phenolic groups:

TABLE I

| Examples | Vinyl ester |
|---|---|
| 2 | $CH_2=CHOCOCH_3$ + HOOC–(3,5-di-t-butyl)–C$_6$H$_2$–OH → $CH_2=CHOCO$–(3,5-di-t-butyl)–C$_6$H$_2$–OH |
| 3 | $CH_2=CHOCOCH_3$ + HOOC–(3,5-di-isopropyl)–C$_6$H$_2$–OH → $CH_2=CHOCO$–(3,5-di-isopropyl)–C$_6$H$_2$–OH |
| 4 | $CH_2=CHOCOCH_3$ + HOOC–(3,5-di-t-butyl)–C$_6$H$_2$–OH → $CH_2=CHOCOCH_2$–(3,5-di-t-butyl)–C$_6$H$_2$–OH |
| 5 | $CH_2=CHOCOCH_3$ + $HOCOCH_2O$–(3,5-dimethyl)–C$_6$H$_2$–OH → $CH_2=CHOCOCH_2O$–(3,5-dimethyl)–C$_6$H$_2$–OH |
| 6 | $CH_2=C(CH_3)OCOCH_3$ + $HOCOCH_2CH_2$–(3,5-di-t-butyl)–C$_6$H$_2$–OH → $CH_2=C(CH_3)OCOCH_2CH_2$–(3,5-di-t-butyl)–C$_6$H$_2$–OH |
| 7 | $CH_2=CHOCOCH_3$ + $HOCOCH_2$-$CH_2$–(3-t-butyl-5-isopropyl)–C$_6$H$_2$–OH → $CH_2=C(CH_3)OCOCH_2CH_2$–(3-t-butyl-5-isopropyl)–C$_6$H$_2$–OH |
| 8 | $CH_2=C(CH_3)OCOCH_3$ + $HOCOCH_2CH_2$–(3,5-di-isopropyl)–C$_6$H$_2$–OH → $CH_2=C(CH_3)OCOCH_2CH_2$–(3,5-di-isopropyl)–C$_6$H$_2$–OH |
| 9 | $CH_2=CHOCOCH_3$ + $HOCOCH_2CH_2$–(3-isopropyl)–C$_6$H$_3$–OH → $CH_2=CHOCOCH_2CH_2$–(3-isopropyl)–C$_6$H$_3$–OH |
| 10 | $CH_2=CHOCOCH_3$ + $HOCO(CH_2)_6$–(3,5-di-t-butyl)–C$_6$H$_2$–OH → $CH_2=CHOCO(CH_2)_6$–(3,5-di-t-butyl)–C$_6$H$_2$–OH |

In the above Table I, the substituents on the phenyl ring are defined as follows: — (a straight line) denotes methyl group; —⟨ denotes isopropyl group; ✕ denotes tert-butyl group.

EXAMPLE 11

Isopropenyl 3-(3,5-di-t-butyl-4-hydroxyphenyl)-propionate

The procedure of Example 1 was followed except that vinyl acetate was replaced with isopropenyl acetate yielding the above named product.

EXAMPLE 12

Vinyl 3,5-di-tert-butyl-4-hydroxybenzoate

Following the procedure of Example 1, vinyl acetate is reacted with 3,5-di-t-butyl-4-hydroxybenzoic acid yielding the above named product.

EXAMPLE 13

Vinyl 3,5-di-tert-butyl-4-hydroxyphenoxy acetate

By reacting 28.0 g. (0.10 mole) of 3,5-di-tert-butyl-4-hydroxyphenoxy acetic acid with 86.0 g. (1.0 mole) of vinyl acetate following the procedure of Example 1, there is obtained vinyl 3,5-di-tert-butyl-4-hydroxyphenoxy acetate.

What is claimed is:

1. A compound having the formula

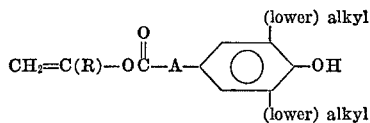

wherein
R is hydrogen or methyl group,
A is a group —$C_nH_{2n}$ or —$C_mH_{2m}O$—,
$n$ is 0 to 6, and
$m$ is 1 to 6.

2. A compound according to claim 1 wherein A is a group —$C_nH_{2n}$.

3. A compound according to claim 1 wherein (lower) alkyl groups are tert-butyl groups and both are located in positions ortho to the hydroxy group.

4. A compound according to claim 1 wherein A is —$C_nH_{2n}$, $n$ is zero or 2 and (lower)alkyl group is tert-butyl.

5. A compound according to claim 1 which is vinyl 3-(3,5-di-t-butyl-4-hydroxyphenyl)propionate.

6. A compound according to claim 1 which is isopropenyl 3-(3,5-di-t-butyl-4-hydroxyphenyl)propionate.

7. A compound according to claim 1 which is isopropenyl 3-(3,5-dimethyl-4-hydroxyphenyl)benzoate.

References Cited

FOREIGN PATENTS 693,410   9/1964   Canada _____ 260—473 S

LORRAINE A. WEINBERGER, Primary Examiner

J. F. TERAPANE, Assistant Examiner

U.S. Cl. X.R.

260—473 G